United States Patent [19]
Okubo

[11] Patent Number: 5,369,585
[45] Date of Patent: Nov. 29, 1994

[54] ANTI-LOCK CONTROL SYSTEM FOR MOTOR VEHICLES

[75] Inventor: Satomi Okubo, Saitama, Japan

[73] Assignee: Akebono Brake Industry Co., Ltd., Tokyo, Japan

[21] Appl. No.: 907,565

[22] Filed: Jul. 2, 1992

[30] Foreign Application Priority Data

Jul. 5, 1991 [JP] Japan ................... 3-191225

[51] Int. Cl.$^5$ .................................. B60T 8/70
[52] U.S. Cl. .................. 364/426.02; 303/97; 303/94; 180/197
[58] Field of Search .......... 364/426.02; 303/108, 303/97, 94, 106; 180/197

[56] References Cited

U.S. PATENT DOCUMENTS

| | | | |
|---|---|---|---|
| 4,188,075 | 2/1980 | Rayput et al. | 303/106 |
| 4,327,414 | 4/1982 | Klein | 364/426 |
| 4,673,226 | 6/1987 | Every et al. | 303/109 |
| 4,787,683 | 11/1988 | Singleton | 303/110 |
| 4,825,371 | 4/1989 | Hoashi et al. | 364/426.02 |
| 4,924,394 | 5/1990 | Uchida et al. | 364/426.02 |
| 5,092,662 | 3/1992 | Okubo | 303/106 |
| 5,150,950 | 9/1992 | Arikawa et al. | 303/100 |
| 5,190,360 | 3/1993 | Sano | 303/92 |

*Primary Examiner*—Thomas G. Black
*Assistant Examiner*—Julie D. Day
*Attorney, Agent, or Firm*—Cushman, Darby & Cushman

[57] ABSTRACT

An anti-lock control system in which a pressure increasing cycle changes according to the behavior of a wheel during a pressure increasing mode of anti-lock control. The anti-lock control system determines a coefficient of friction of a road surface, sets a maximum vehicle body deceleration according to the coefficient of friction, calculates the deceleration of the wheel speed to be controlled, compares the deceleration of the wheel speed to be controlled with the maximum vehicle body deceleration Gmax to determine whether or not to increase or maintain constant the brake fluid pressure.

3 Claims, 7 Drawing Sheets

ANTI-LOCK CONTROL SYSTEM FOR MOTOR VEHICLES

BACKGROUND OF THE INVENTION

1. Field of the Invention

The present invention relates, generally, to an anti-lock control system and, more particularly, to an anti-lock control system wherein a pressure increasing cycle changes according to the wheel speed, during braking of the vehicle.

2. Discussion of the Prior Art

Typical anti-lock control systems for motor vehicles include a control unit having a microcomputer operating as follows: A wheel speed is detected by a wheel speed sensor, a controlled wheel speed (hereinafter referred to as "a control speed") is selected according to an electrical signal representing the detected wheel speed and a brake fluid pressure control mode, for increasing, decreasing or maintaining a brake fluid pressure, is determined according to the control speed selected. A hold valve comprising a normally opened electromagnetic valve and a decay valve comprising a normally closed electromagnetic valve are operated (opened and closed) so that the brake liquid pressure is increased, decreased or maintained constant.

When the hold valve is opened and the decay valve is closed, the brake fluid pressure is increased. When the hold valve is closed and the decay valve is also closed, the brake fluid pressure is maintained. When the hold valve is closed and the decay valve is open, the brake fluid pressure is decreased. During a normal braking, the brake fluid pressure increases and held cyclically (pressure increasing cycle) so that the brake fluid pressure is increased stepwise. In this case, the period of time the hold valve is closed is held constant and the period of time the hold valve is open is changed, thereby changing the duration of the pressure increasing cycle.

In conventional anti-lock control systems, the duration of the pressure increasing cycle is determined from the coefficient of friction $\mu$ of a road surface (hereinafter referred to as "a road surface $\mu$") which is detected before the pressure increasing mode occurs, thereby predetermining a pressure increasing cycle. In the pressure increasing mode, the brake fluid pressure is increased according to the pressure increasing cycle thus set. This means that the pressure is increased irrespective of the behavior of the wheels. Hence, if the road surface $\mu$ decreases during the pressure increasing operation, the pressure is excessively increased so that the wheel speed is greatly reduced. Whereas if the road surface $\mu$ then increases, the pressure becomes insufficient, and the braking force is not great enough.

SUMMARY OF THE INVENTION

In view of the foregoing, an object of this invention is to provide an anti-lock control system which is stable in operation. For instance, in a pressure increasing mode, the pressure increasing cycle changes freely in response to the behavior of a wheel. Thus, the problems of the prior art are eliminated, wherein the brake fluid pressure is excessively increased to reduce the wheel speed, thereby causing the brake fluid pressure to become insufficient as the coefficient of friction corresponding to the road surface changes.

The object of the present invention is achieved with an anti-lock control system comprising: a first determining means for determining a coefficient of friction $\mu$ of a road surface; means for setting a maximum vehicle body deceleration Gmax in advance, which is capable of occurring with the road surface having the coefficient of friction $\mu$ which has been determined by the determining means; means for calculating a deceleration g of the wheel speed to be controlled; comparison means for comparing the deceleration g of the wheel speed to be controlled with the maximum vehicle body deceleration Gmax; and a second determining means for determining whether or not to increase or maintain constant the brake fluid pressure according to a result from the comparison means.

DETAILED DESCRIPTION OF THE PREFERRED EMBODIMENT

A preferred embodiment of the present invention will be described with reference to the accompanying drawings.

Figure 1:
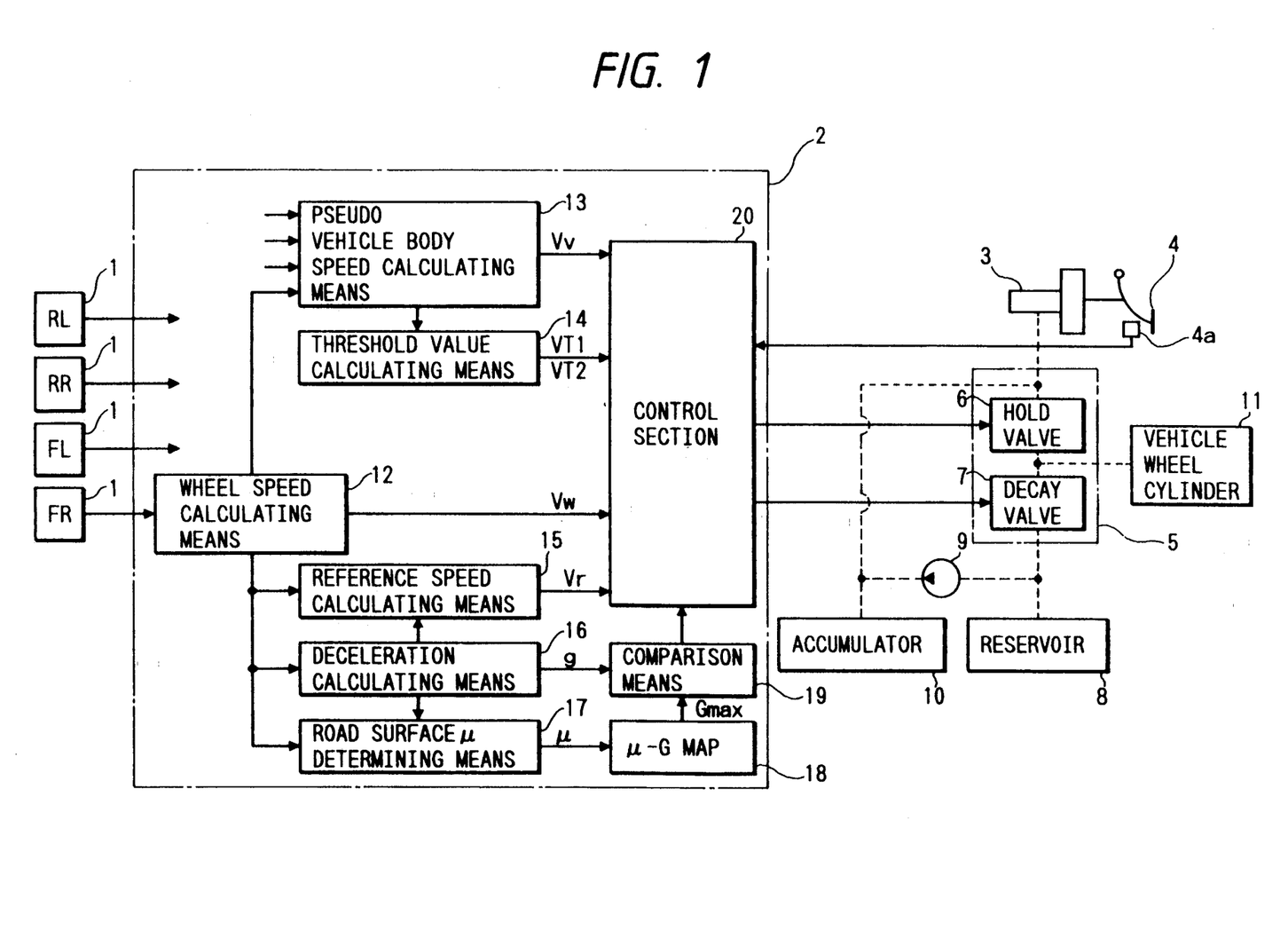
FIG. 1 is a block diagram showing an arrangement of an anti-lock control system of the present invention.

Referring to FIG. 1, reference numeral 1 designates four wheel rotation speed sensors each mounted on four wheels to detect the speeds of rotation of the wheels. A master cylinder 3 is operated by a brake pedal 4. A modulator 5 comprises a normally opened electromagnetic valve, namely, a hold valve 6, and a normally closed electromagnetic valve, namely, a decay valve 7. Brake fluid is pumped from a reservoir 8 into an accumulator 10 by a pump 9 and held therein. A brake switch 4a is turned on when the operator steps on the brake pedal 4.

A control unit 2 includes a microcomputer comprising a wheel speed calculating means 12 for calculating wheel speeds Vw from the outputs of the wheel rotation speed sensors 1; pseudo vehicle body speed calculating means 13 which selects the highest of the four wheel speeds Vw thus calculated and limits the acceleration and deceleration thereof within a predetermined amount, for example, $\pm G$, to obtain a pseudo vehicle body speed Vv; threshold value calculating means 14 for calculating a first threshold speed VT1 and a second threshold speed VT2 which follow the pseudo vehicle body speed Vv with predetermined speed differences, where Vv is greater than VT1 which is greater than VT2; and reference speed calculating means 15 for calculating a reference speed Vr which is referred to when a brake fluid pressure decreasing time is determined.

The wheel speed Vw calculated by the wheel speed calculating means 12 is the wheel speed of the front right wheel FR. In a three-channel anti-lock control system, generally applied to rear drive vehicles, the rotation speeds of the front left wheel FL and the front right wheel FR are employed as first and second control speeds, respectively, and the lower of the wheel speeds of the rear left wheel RL and the rear right wheel RR is selected as a third control speed. The preferred embodiment will be described with the wheel speed Vw of the front right wheel FR calculated by the wheel speed calculating means 12 as a control speed.

When the deceleration g of the control speed Vw reaches a predetermined value (for example $-1G$) as a result of a braking operation, the reference speed Vr calculated by the reference speed calculating means 15 is a speed which is linearly decreased at a gradient of $-1G$, for example, with the speed as a reference point which is lower by a predetermined value than the control speed Vw.

Figure 2:
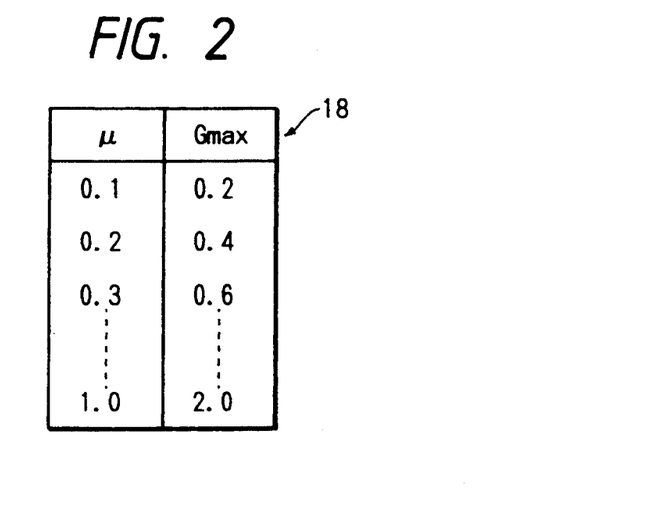
FIG. 2 is a diagram showing a road surface condition and maximum vehicle deceleration chart.

The control unit 2 further comprises deceleration calculating means 16 for calculating the deceleration g of the control speed Vw; road surface $\mu$ determining means for determining a road surface $\mu$ from the variations of the control speed Vw; a $\mu$-G chart 18 indicating maximum vehicle body decelerations Gmax which may occur with a variety of road surfaces $\mu$ as shown in FIG. 2; comparison means 19 for comparing the maximum vehicle body deceleration Gmax read out of the $\mu$-G chart 18 with the deceleration g of the control speed Vw provided by the deceleration calculating means 16; and a control section 20. The control section 20 controls the on-off operations of the hold valve 6 and the decay valve 7 according to the outputs of the above-described means 12 through 19, to increase, decrease or maintain the brake liquid pressure in a wheel cylinder 11 of a brake device.

Figure 3:
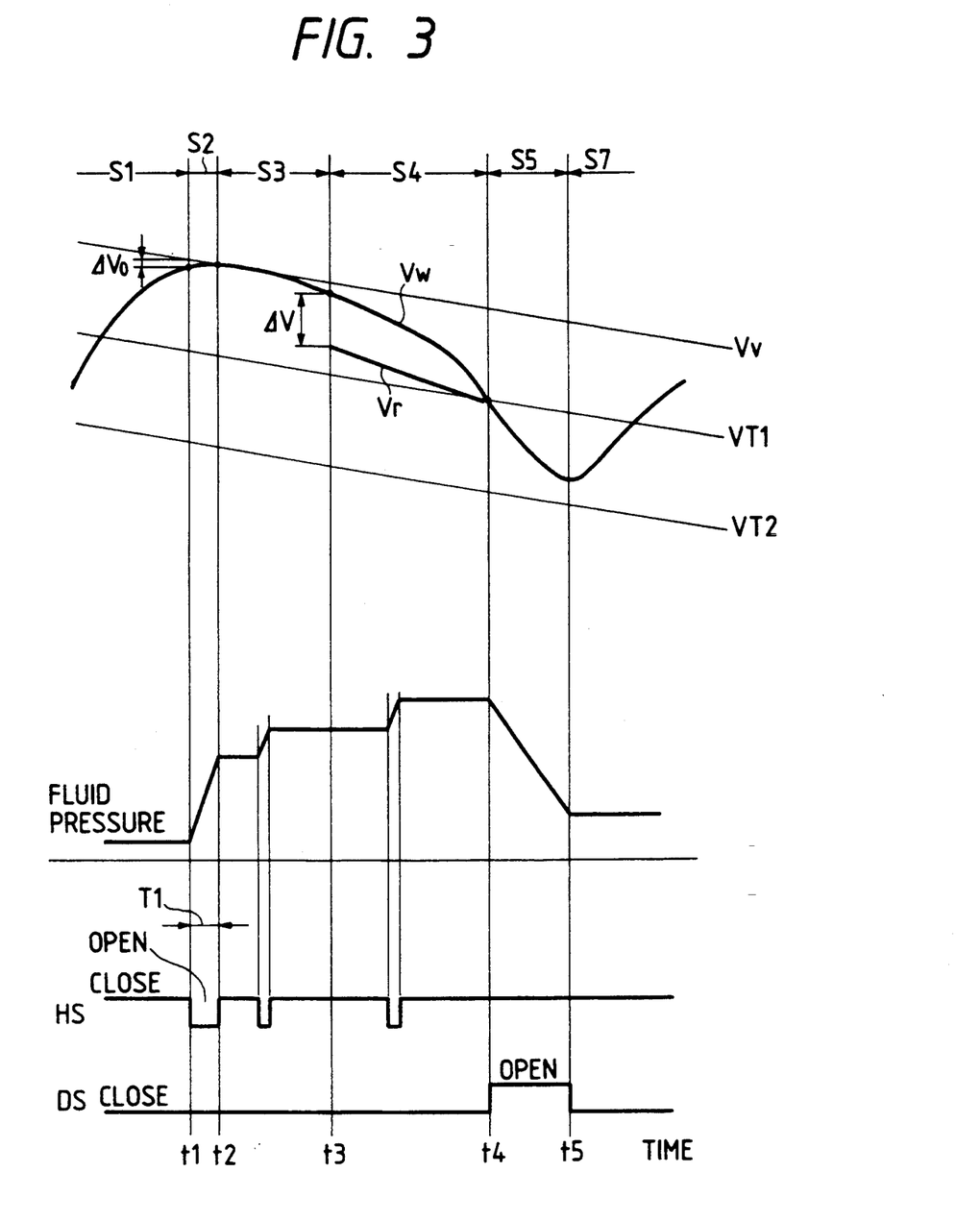
FIG. 3 is a timing chart showing a first example of an anti-lock control performed by the anti-lock control system according to the present invention.

One example of an anti-lock control performed by the control section 20 will be described with reference to the timing chart of FIG. 3. FIG. 3 shows part of the periodic variations of the control speed Vw during the anti-lock control. The control changes according to the following statuses:

(1) Status S1 (Hold mode)
Status S1 corresponds to the time that the brake liquid pressure is maintaining constant until the time that the control speed Vw reaches a value (Vv−ΔVo), which is lower than the pseudo vehicle body speed Vv by a predetermined value V.

(2) Status S2 (Quick pressure increase mode)
Status S2 corresponds to a period of time which lapses from the time t1 that the control speed Vw is below Vv (Vv−Vo) until the time t2 which occurs a predetermined period of time T1 thereafter. In Status 2, a hold signal HS applied to the hold valve 6 is turned off to open the hold valve 6, thereby quickly increasing the brake fluid pressure.

(3) Status S3 (Slow pressure increase mode)
Status S3 corresponds to a period of time between the time t2 which is the end of Status S2 and the time t3 in which the reference speed Vr is provided. In Status S3, the hold valve is opened and closed (on and off), to slowly increase the brake fluid pressure.

(4) Status S4 (Slow pressure increase mode)
Status S4 corresponds to a period of time between the time t3 that the reference speed Vr is produced and the earlier of the times that the control speed Vw becomes lower than the reference speed Vr or the first threshold speed VT1. In the case of FIG. 3, Status S4 is ended at the time t4 that the control speed Vw becomes lower than the first threshold speed VT1. However, if the control speed Vw becomes lower than the reference speed Vr before the time t4 occurs, then Status S4 is ended at that time.

(5) Status S5 (Pressure decrease mode)
Status S5 corresponds to a period of time between the time t4 that decreasing the brake liquid pressure is started and the time t5 that the control speed Vw reaches its low peak. However, the control speed Vw should not be lower than the second threshold VT2.

(6) Status S6 (Pressure decrease mode)
Status S6 is for the case where the control speed Vw becomes lower than the second threshold VT2. That is, Status S6 corresponds to a period of time between the time t4 that the control speed Vw becomes lower than the second threshold VT2 and the time t5 that the control speed Vw is restored to the second threshold VT2.

(7) Status S7 (Hold mode)
Status S7 corresponds to a hold mode effected from the time t5 where the fluid pressure is maintained.

A specific feature of the anti-lock control system of the present invention is that the duration of the pressure increasing cycle is changed according to the behavior of a wheel, unlike the conventional system in which the brake liquid pressure is increased with a constant duration of pressure increasing cycle. Thus, in the preferred embodiment the deceleration g of the control speed Vw is measured at all times, and the maximum vehicle body deceleration Gmax is set with reference to the $\mu$-G chart, for example, as shown in FIG. 2, where $\mu$ represents the present road surface condition. The maximum vehicle body deceleration Gmax is utilized to set a speed reducing condition for determining the state of deceleration of the control speed Vw. The maximum vehicle body deceleration Gmax is proportional to the value of the coefficient of friction.

When the control speed Vw does not meet the speed reducing condition, that is, when g<Gmax, the duration of the pressure increasing cycle is reduced. In the case where the pressure increasing time period is constant in one pressure increasing cycle, the hold time period is reduced to increase a pressure increasing rate, so that the brake fluid pressure is sufficiently increased. On the other hand, when the control speed Vw meets the speed reducing condition, that is, when g≧Gmax, the duration of the pressure increasing cycle is increased. In the case where the pressure increasing time period is constant in one pressure increasing cycle, the hold time period is increased to decrease the pressure increasing rate, thereby decreasing the degree of increase of the brake fluid pressure.

Figure 4:
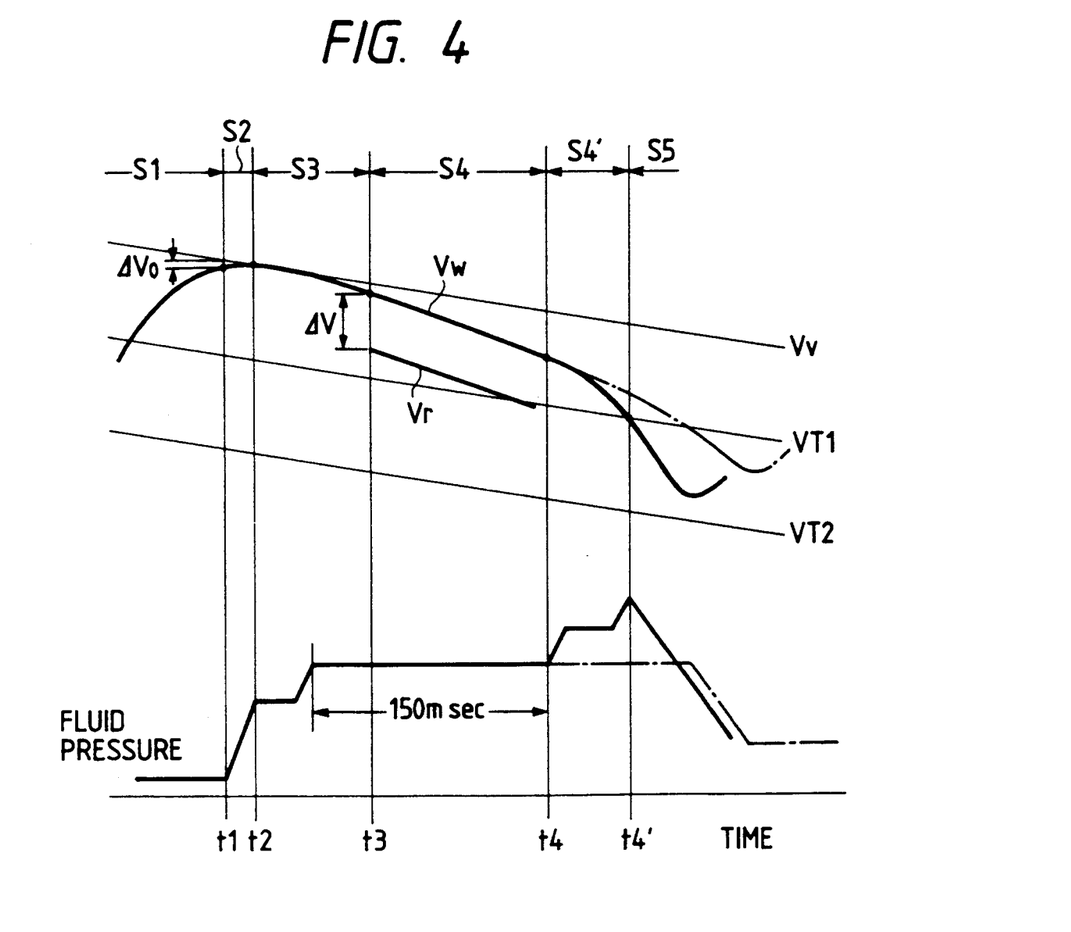
FIG. 4 is a timing chart showing a second example of an anti-lock control performed by the anti-lock control system according to the present invention.
Figure 7:
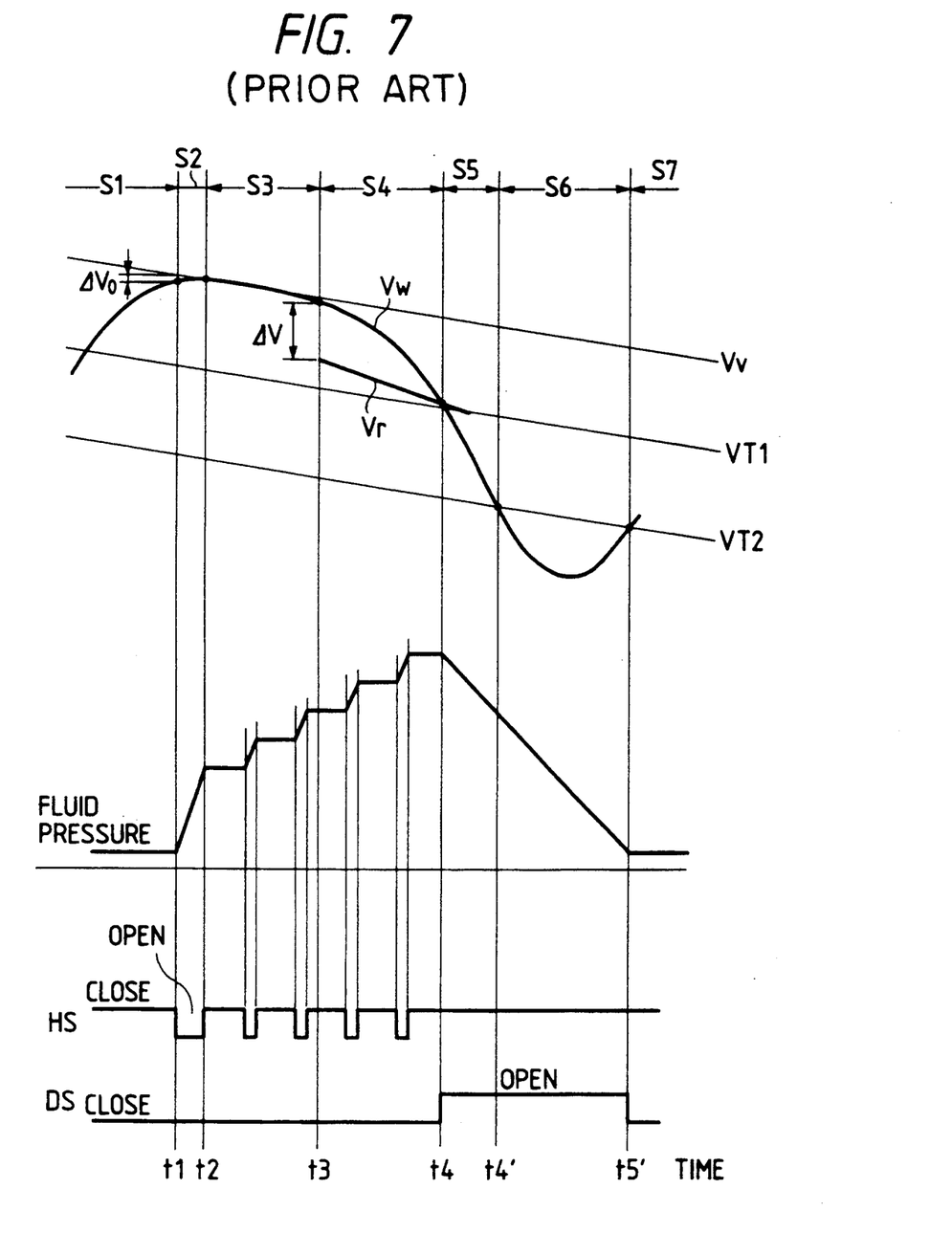
FIG. 7 (PRIOR ART) is a timing chart showing an example of an anti-lock control performed by a conventional anti-lock control system.

In the conventional control system, as shown in FIG. 7 (PRIOR ART), the slow pressure increasing operations of Statuses S3 and S4 are carried out with a constant duration of pressure increasing cycle, and therefore when the road surface $\mu$ becomes low, the pressure is excessively increased, so that the control speed Vw is greatly decreased. On the other hand, in the control system of the present invention, as shown in FIG. 3, the hold time period in one pressure increasing cycle is increased to decrease the pressure increasing rate, thereby preventing the control speed Vw from decreasing. However, it should be noted that in order to prevent the control cycle from being extremely long, the maximum value of the hold time period is set, for example, to 150 msec, as shown in FIG. 4.

Figure 5:
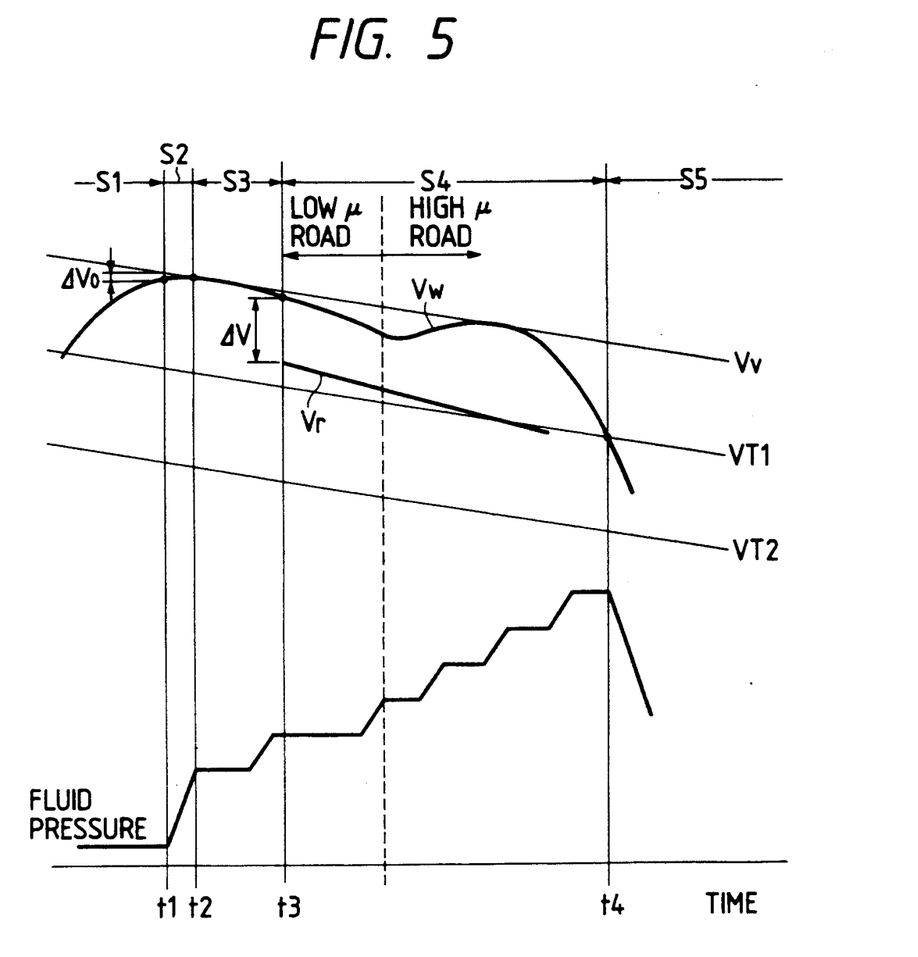
FIG. 5 is a timing chart showing a third example of an anti-lock control performed by the anti-lock control system according to the present invention.
Figure 8:
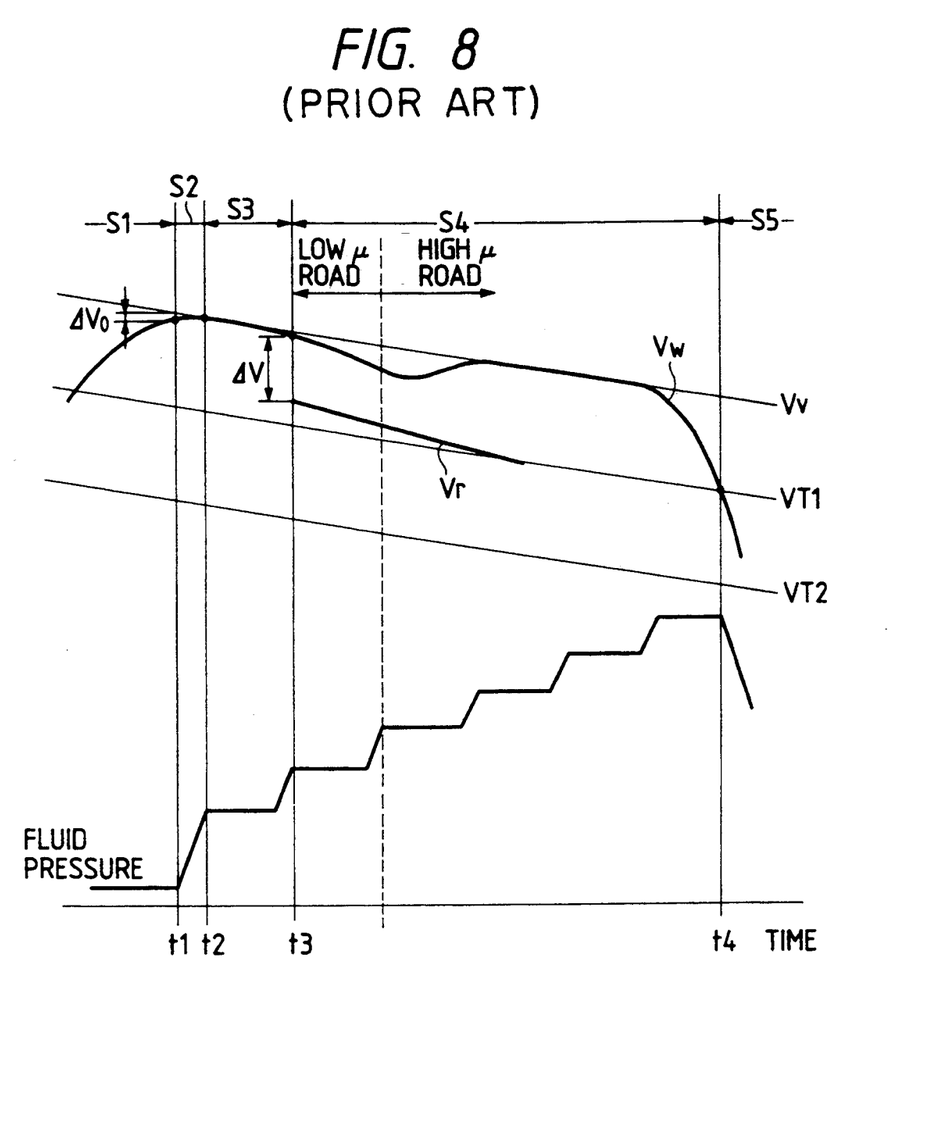
FIG. 8 (PRIOR ART) is a timing chart showing another example of an anti-lock control performed by a conventional anti-lock control system.

Let us consider the case where the road surface μ becomes high in Statuses S3 and S4. In the conventional control system, the pressure is increased with a constant duration of pressure increasing cycle as shown in FIG. 8 (PRIOR ART), and therefore the braking force is insufficient and the control speed Vw is close to the pseudo vehicle body speed Vv for a long period of time. On the other hand, in the control system of the present invention, the control is carried out as shown in FIG. 5. That is, as the road surface μ changes from low to high, the hold time period of the brake fluid pressure of one pressure increasing cycle is decreased to increase the pressure increasing rate, so that the pressure is increased sufficiently. Accordingly, the period of time is short in which the control speed V is close to the pseudo vehicle body speed Vv.

Figure 6:
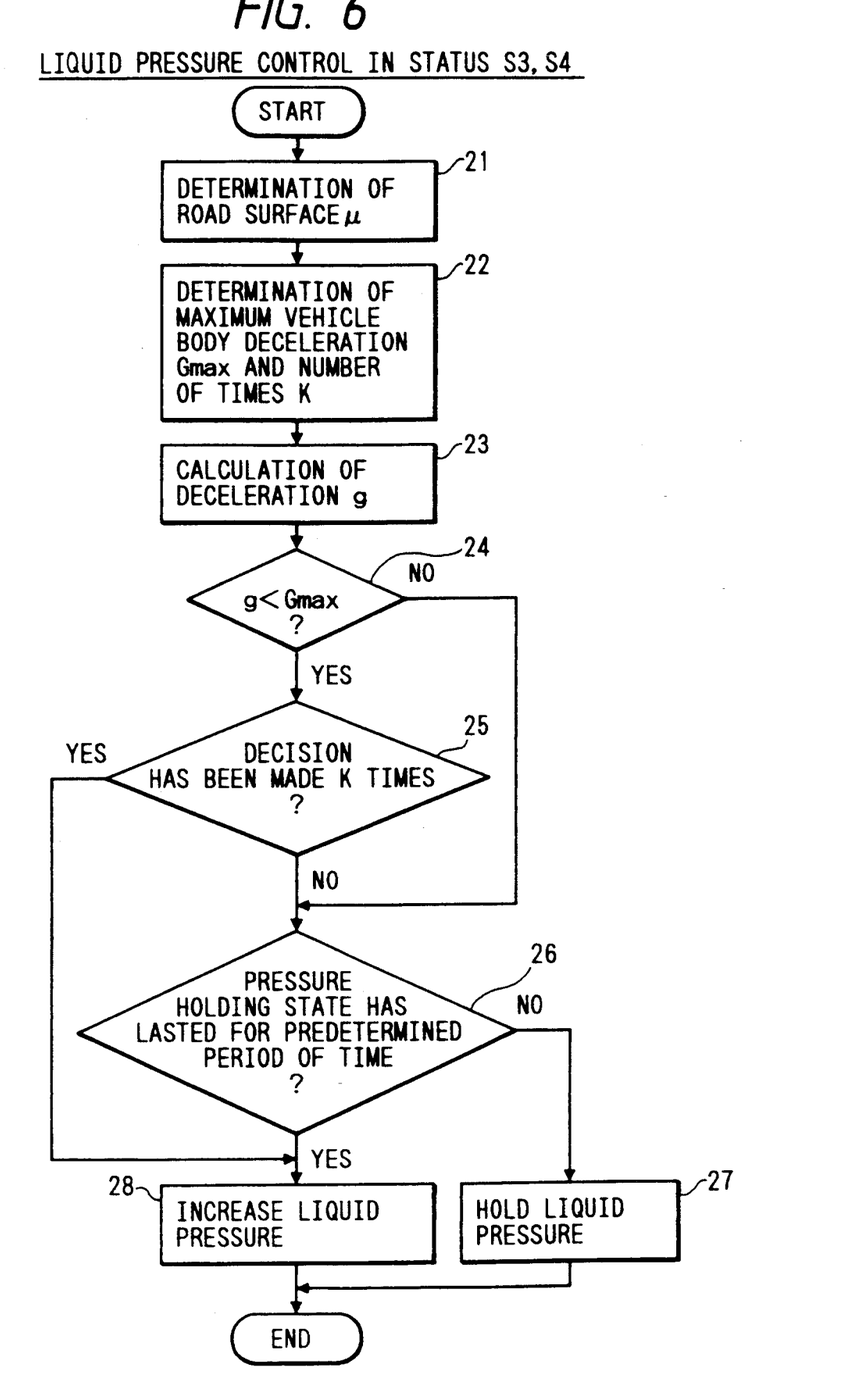
FIG. 6 is a flow chart showing the brake liquid pressure control performed by the anti-lock control system according to the present invention.

FIG. 6 is a flow chart describing the brake liquid pressure control performed by the control unit 2 in Statuses S3 and S4. First, in Step 21, the road surface μ determining means 17 operates to determine a road surface μ. Next, in Step 22, the maximum vehicle body speed Gmax occurring with the road surface μ thus determined is read from the μ-G chart 18 to determine a speed reducing condition, and the number K of times a decision is made about the speed reducing conditions is determined. In Step 23, the deceleration calculating means 16 calculates the deceleration g of the control speed Vw. In step 24, the comparison means 19 compares the deceleration g of the control speed Vw with the maximum vehicle body deceleration Gmax. When g<Gmax, Step 25 occurs. That is, it is determined whether or not the decision of the speed reducing condition has been made K times. When the number of times K is not reached, Step 26 occurs. In Step 26, it is determined whether or not the pressure holding state has lasted for a predetermined period of time (for instance 150 msec). If not, Step 27 occurs. That is, the brake liquid pressure is held. On the other hand, when, in Step 25, it is determined that the decision with the pressure increasing condition has been made K times, then Step 28 occurs so that the brake liquid pressure is increased. When, in Step 26, it is determined that the pressure holding state has lasted for the predetermined period of time, Step 28 occurs to increase the brake liquid pressure. Thus, the anti-lock control is carried out with high stability.

As is apparent from the above description, in the control system of the present invention, instead of a constant pressure increasing pattern, a pressure increasing pattern is employed which is changed freely in response to the behavior of a wheel. Hence, with the control system of the invention, the brake fluid pressure is not excessively increased to greatly decrease the wheel speed, but is sufficiently increased based on the variation in the coefficient of friction of the road surface. That is, the anti-lock control system of the present invention is able to perform the anti-lock control with high stability.

It should be understood that the foregoing relates to a preferred embodiment of the invention, and that it is intended to cover all changes and modifications of the embodiment of the invention herein which do not constitute departures from the spirit and scope of the invention.

What is claimed is:

1. An anti-lock control apparatus for controlling a wheel speed of a vehicle during braking, by sensing a wheel speed of a wheel with a wheel rotation speed sensor, processing said sensed wheel speed and outputting a control signal which controls an anti-lock braking action of said wheel by increasing or maintaining constant a brake fluid pressure, said apparatus comprising:
   first determining means for determining a coefficient of friction of a road surface;
   means for setting a maximum vehicle body deceleration value capable of occurring with the road surface based upon said coefficient of friction;
   means for calculating a wheel deceleration value of said wheel speed;
   comparison means for comparing said wheel deceleration value with said maximum vehicle body deceleration value; and
   second determining means for determining whether to increase or maintain constant said brake fluid pressure according to a result from said comparison means.

2. An anti-lock control apparatus according to claim 1, wherein said maximum vehicle body deceleration value is proportional to the value of said coefficient of friction.

3. An anti-lock control apparatus according to claim 1, wherein said second determining means determines to increase said brake fluid pressure when said wheel deceleration value is less than said maximum vehicle body deceleration value and said second determining means determines to maintain constant said brake fluid pressure when said wheel deceleration value is greater or equal to said maximum vehicle body deceleration value.

* * * * *